(12) United States Patent
Mizuno et al.

(10) Patent No.: US 6,379,215 B1
(45) Date of Patent: *Apr. 30, 2002

(54) EYEGLASS LENS PROCESSING SYSTEM

(75) Inventors: Toshiaki Mizuno; Ryoji Shibata, both of Aichi (JP)

(73) Assignee: Nidek Co., Ltd., Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,843

(22) Filed: Sep. 29, 1999

(30) Foreign Application Priority Data

Sep. 29, 1998 (JP) .......................................... 10-275031

(51) Int. Cl.[7] .............................................. B24B 49/00
(52) U.S. Cl. ............................. 451/5; 451/43; 451/255; 451/256; 451/388; 451/390
(58) Field of Search .............................. 451/5, 43, 242, 451/244, 246, 251, 254, 255, 256, 384, 388, 390

(56) References Cited

U.S. PATENT DOCUMENTS

| | | | | |
|---|---|---|---|---|
| 4,479,332 A | * | 10/1984 | Stern et al. ................. 451/43 |
| 4,656,590 A | * | 4/1987 | Ace ........................... 451/43 |
| 4,912,880 A | * | 4/1990 | Haddock et al. ............. 451/43 |
| 4,945,684 A | * | 8/1990 | Wada et al. ................. 451/43 |
| 5,053,971 A | * | 10/1991 | Wood et al. ................. 451/43 |
| 5,148,637 A | * | 9/1992 | Byron ......................... 451/43 |
| 5,155,940 A | * | 10/1992 | Suzuki ........................ 451/43 |
| 5,257,198 A | * | 10/1993 | van Schoyck ................ 451/5 |
| 5,341,604 A | * | 8/1994 | Wood .......................... 451/5 |
| 5,454,194 A | * | 10/1995 | Gottschald .................. 451/5 |
| 5,454,748 A | * | 10/1995 | Gottschald .................. 451/43 |
| 5,588,899 A | * | 12/1996 | Gottschald .................. 451/43 |
| 5,595,522 A | * | 1/1997 | Simpson et al. ............. 451/43 |
| 5,653,626 A | | 8/1997 | Gottschald et al. ......... 451/384 |
| 5,716,256 A | | 2/1998 | Mizuno et al. ............... 451/5 |
| 5,727,987 A | * | 3/1998 | Gottschald .................. 451/43 |
| 5,738,563 A | * | 4/1998 | Shibata ....................... 451/43 |
| 5,775,973 A | * | 7/1998 | Watanabe .................... 451/43 |
| RE35,898 E | | 9/1998 | Shibata et al. ............... 451/5 |
| 5,803,793 A | | 9/1998 | Mizuno et al. ............... 451/5 |

(List continued on next page.)

FOREIGN PATENT DOCUMENTS

| | | | |
|---|---|---|---|
| EP | A1 0 933 163 | 8/1999 | ......... B24B/13/005 |
| JP | 58-114851 | 7/1983 | ............ B24B/9/14 |
| JP | 7-186027 | 7/1995 | ............ B24B/9/14 |
| JP | 8-290348 | 11/1996 | |

Primary Examiner—M. Rachuba
(74) Attorney, Agent, or Firm—Sughrue Mion, PLLC

(57) ABSTRACT

An eyeglass lens processing system, including: a data input unit, which inputs frame shape data for processing a lens to be fitted to an eyeglass frame and layout data for providing a layout of the lens with respect to a frame shape; a lens processing unit, having two shafts for clamping the lens, for grinding a periphery of the lens; a first conveying unit, which conveys a tray on which the lens is placed and to which a management code is applied, the management code interrelating the lens placed on the tray to the data inputted by the data input unit; a lens measuring unit, which obtains at least an optical center position of the lens; a second conveying unit that picks and holds the lens, disposes the lens at a predetermined position of the lens measuring unit, and mounts the lens to the shafts of the lens processing unit after measurement by the lens measuring unit; and an arithmetic unit, which obtains processing data based on: (1) data, read out based on the management code applied to the tray from the data inputted by the data input unit, and (2) measurement data obtained by the lens measuring unit, the arithmetic unit being connected to the lens processing unit.

20 Claims, 9 Drawing Sheets

U.S. PATENT DOCUMENTS

| | | | | |
|---|---|---|---|---|
| 5,895,314 A | * | 4/1999 | Kitao et al. | 451/43 |
| 5,908,348 A | * | 6/1999 | Gottschald | 451/43 |
| 5,967,879 A | * | 10/1999 | Gottschald | 451/5 |
| 5,984,763 A | * | 11/1999 | Kitao et al. | 451/43 |
| 5,993,294 A | * | 11/1999 | Gottschald | 451/43 |
| 6,019,669 A | * | 2/2000 | Kitao et al. | 451/43 |
| 6,045,438 A | * | 4/2000 | Shay | 451/43 |
| 6,050,877 A | * | 4/2000 | Shibata et al. | 451/43 |

* cited by examiner

FIG.3
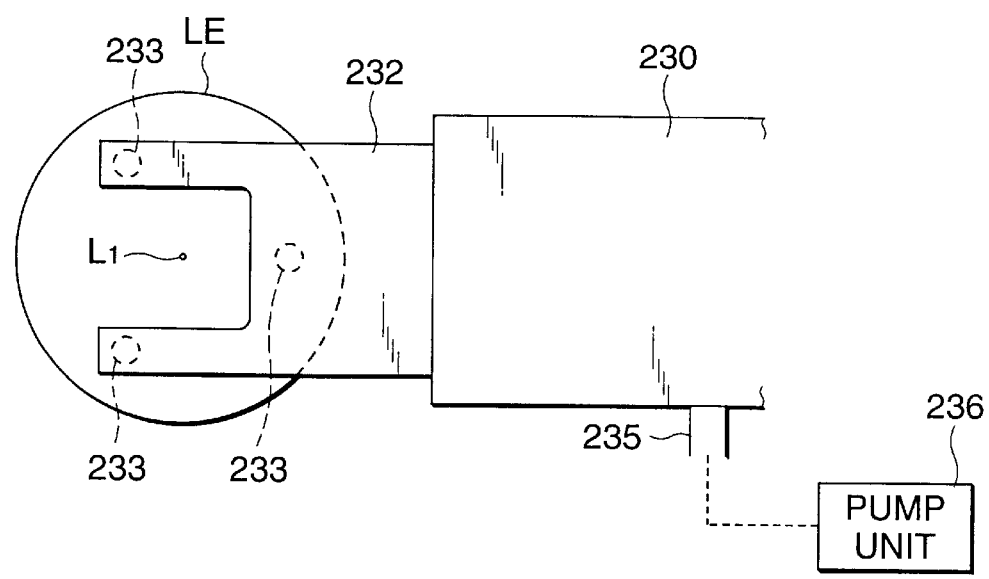
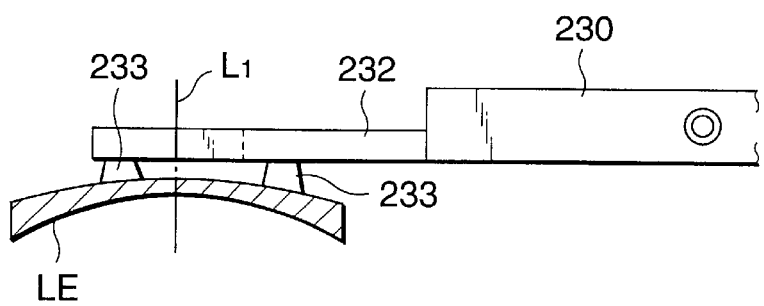

FIG.4
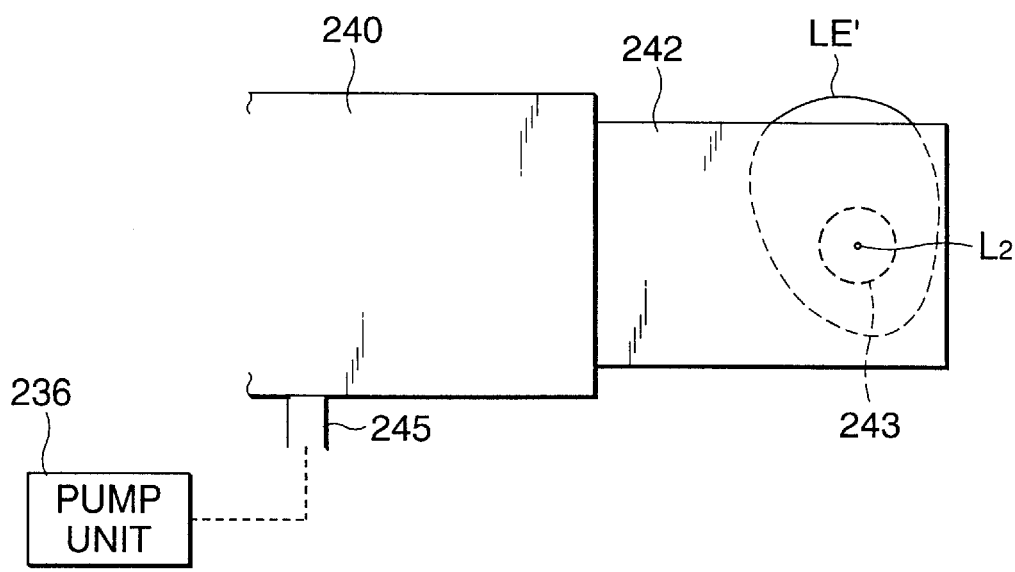
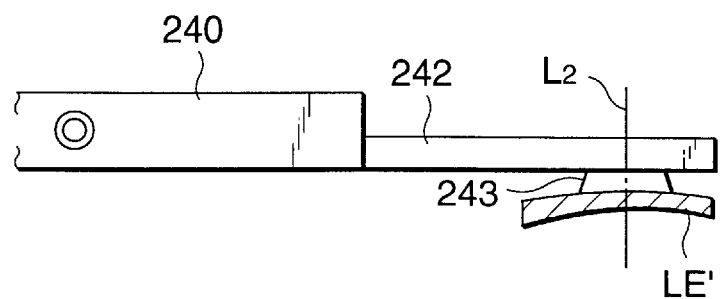

EYEGLASS LENS PROCESSING SYSTEM

BACKGROUND OF THE INVENTION

The present invention relates to an eyeglass lens processing system for grinding a peripheral edge of a subject lens.

Conventionally, in a case where the peripheral edge of a subject lens is ground, processing is performed after a cup serving as a processing jig (a flared suction cup or the like) is attached to the optical center of the lens. A primary purpose of using the cup is to fix the lens so that the lens will not move due to the load applied from a grinding wheel during processing. The followings are other purposes.

When a monofocal lens is processed, a marked point is preliminarily applied to the optical center of the lens by using a lens meter, and the cup is attached to the lens through a cup attaching device, i.e., a so-called aligner, with that marked point used as a reference mark. Subsequently, a cup portion is mounted on a cup holder of a lens chuck shaft provided in a processing apparatus, and the lens is chucked to perform processing. As a result, the processing apparatus is able to effect processing while managing the relationship between the rotational center of the lens and the optical center thereof.

In contrast, to attach the lens directly to the processing apparatus without using the cup, it is necessary to attach the lens by aligning the marked point on the lens and the center of the lens chuck shaft, and it is extremely difficult to enable it in the light of the structure of the apparatus.

In recent years, processing centers have been established where the lens processing which has been conventionally performed by optical shops is performed intensively. The processing centers have come to perform large volumes of lens processing in a concentrated manner in response to requests from optical shops. In such processing centers, there has been a demand for automation of processing so as to effect processing efficiently by saving the trouble of the operator as much as possible.

However, as mentioned above, the lens processing requires, the above-described cup attaching operation as a preliminary step before the processing and the cup removing operation as a subsequent step after the processing, which has been a difficult factor in realizing the automation of processing. In addition, since these operations have been performed manually by the operator, the operating efficiency has been poor.

SUMMARY OF THE INVENTION

In view of the above-described problems of the conventional art, it is an object of the present invention to provide a processing system which makes it possible to effect processing while managing the relationship between the rotational center and the optical center (and the angle of the cylinder axis) of the lens during processing without using the cup as a processing jig.

According to one aspect of the present invention, there is provided:

An eyeglass lens processing system including:

a data input unit, which inputs frame shape data for processing a lens to be fitted to an eyeglass frame, and layout data for providing a layout of the lens with respect to a frame shape;

a lens processing unit, having two shafts for clamping the lens, the processing unit rotates the shafts synchronously for grinding a periphery of the lens, at least one of the shafts has an end to which is provided a holding portion for holding the lens by directly contacting the lens surface without a cup as a processing jig;

a first conveying unit, that conveys a tray on which the lens is placed and to which a management code is applied, the management code interrelating the lens placed on the tray to the data inputted by the data input unit;

a lens measuring unit, which measures at least an optical center position of the lens by detecting and processing an image of a measurement index;

a second conveying unit having a hand part for holding the lens and a moving unit for moving the hand part, wherein the second conveying unit picks and holds the lens from the tray using the hand part, disposes the lens at a predetermined position of the lens measuring unit, and mounts the lens to at least one of the shafts of the lens processing unit after measurement by the lens measuring unit; and an arithmetic unit, which obtains processing data based on the management code applied to the tray from the data inputted by the data input unit.

The present disclosure relates to the subject matter contained in Japanese patent application No. Hei 10-275031 (filed Sep. 29, 1998).

BRIEF DESCRIPTION OF THE DRAWINGS

In the accompanying drawings:

FIG. 3 is a diagram explaining the configuration of a distal end portion of a first hand;

FIG. 4 is a diagram explaining the configuration of a distal end portion of a second hand;

DESCRIPTION OF THE PREFERRED EMBODIMENT

Figure 1:
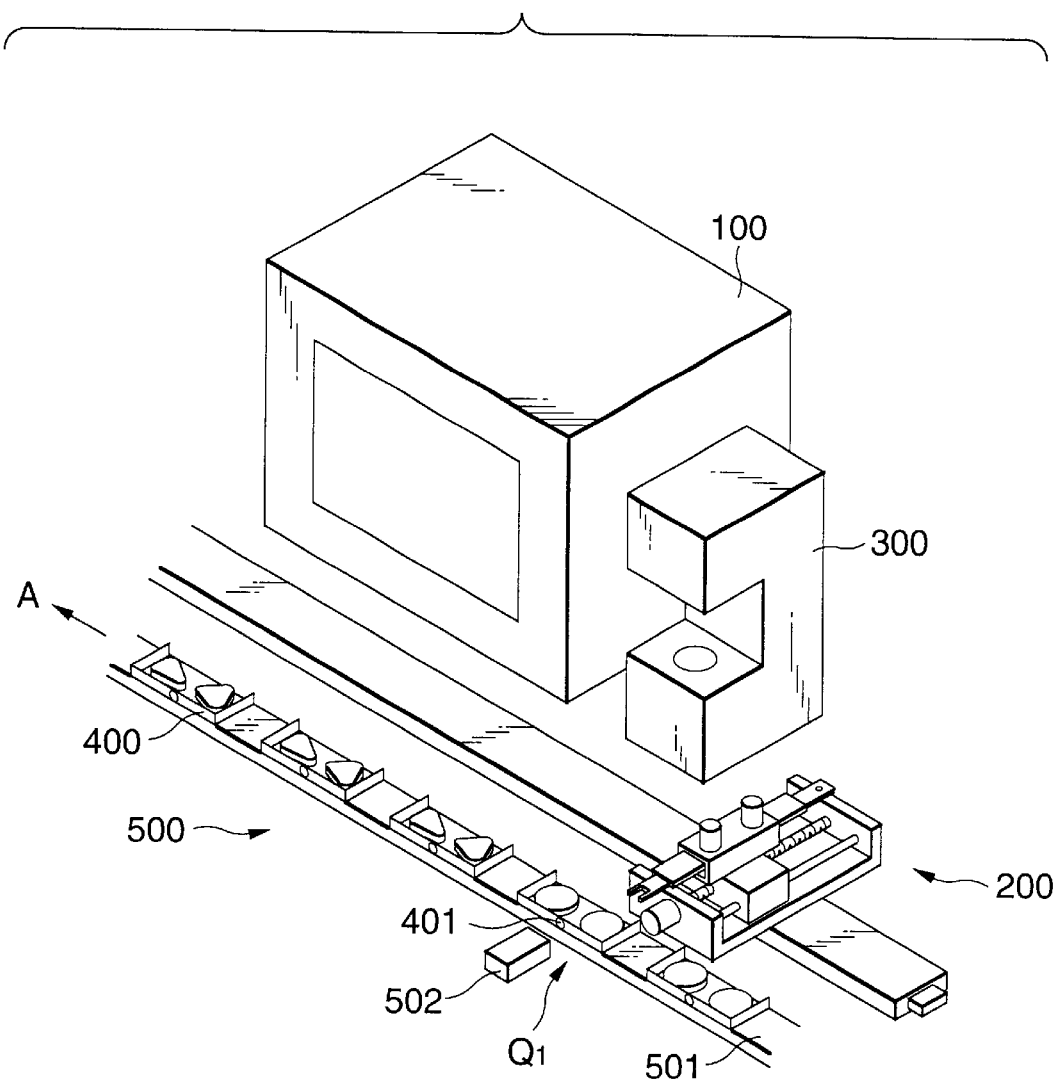
FIG. 1 is a diagram illustrating a schematic external view of an eyeglass lens automatic processing system in accordance with the present invention.

Hereafter, a description will be given of an embodiment of the present invention with reference to the drawings. FIG. 1 is a diagram illustrating a schematic external view of the eyeglass lens automatic processing system in accordance with the present invention. The processing system includes a processing apparatus 100 for grinding an eyeglass lens; a tray conveying apparatus 500 for conveying trays 400, on each of which a pair of left and right subject lenses are placed, to a predetermined delivering position; a lens conveying apparatus 200 for holding the lens to convey the lens between a tray disposed at the predetermined delivering position and the processing apparatus 100; and an eccentricity measuring apparatus 300 for detecting the optical center of the lens held by the conveying apparatus 200 and for measuring its eccentric position. Hereafter, the configurations of the respective apparatuses will be described in order.

<Lens Conveying Apparatus>

Figure 2:
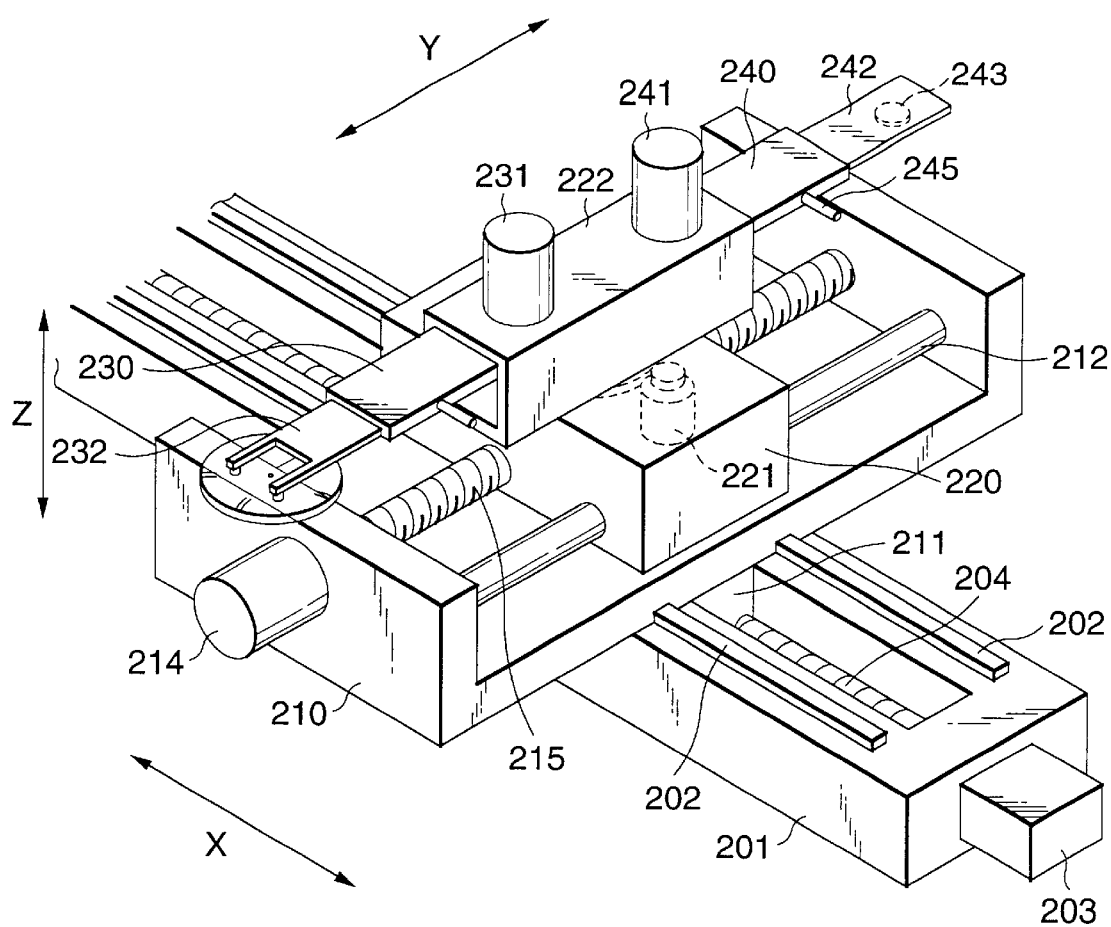
FIG. 2 is a diagram explaining the configuration of a lens conveying apparatus.

First, the configuration of the conveying apparatus 200 will be described with reference to FIGS. 2 to 4. Reference numeral 201 denotes a conveying base which extends in parallel to the processing apparatus 100, the measuring apparatus 300, and the conveying apparatus 500. An X-moving base 210 which moves in the left-and-right direction (in the X-direction) is mounted on a pair of rails 202 provided on the base 201. A ball screw 204 is connected to a rotating shaft of a motor 203 attached to the base 201, and a connecting block 211 fixed to a base 210 is threadedly engaged with the screw 204. As the motor 203 is rotatively driven, the base 210 moves over the base 201 in the X-direction.

A Y-moving base 220 which moves in the back-and-forth direction (in the Y-direction) along two guide shafts 212 is mounted on the base 210. A ball screw 215 connected to a rotating shaft of a motor 214 is threadedly engaged with a lower portion of the base 220, and the base 220 moves in the Y-direction as the motor 214 is rotatively driven. A holder 222 having a first hand 230 for sucking and holding an unprocessed lens LE and a second hand 240 for sucking and holding a processed lens LE' is mounted on the base 220 in such a manner as to be capable of swiveling, so that the holder 222 is adapted to swivel 180 degrees via an unillustrated gear by a motor 221 accommodated in the base 220. The first hand 230 and the second hand 240 are held by the holder 222 in such a manner as to be movable in the vertical direction (in the Z-direction) by motors 231 and 241, respectively.

A sucking base 232 is fixed to an end portion of the first hand 230, and its distal end portion is formed substantially in a U-shape, as shown in FIG. 3, so as to secure a range of passage of a beam for measurement by the measuring apparatus 300 which will be described later. Further, three suckers 233 projecting downward for sucking the surface of the lens LE are provided on the sucking base 232 at equal intervals by using as a center a holding reference axis L1 for the X-Y direction which the first hand 230 has. Each sucker 233 has a suction hole, and the suction hole communicates with a tube 235 through air passages formed inside the sucking base 232 and the first hand 230. The tube 235 is connected to a pump unit 236 which effects the suction and delivery of air, and as the pump unit 236 is driven and sucks, the lens LE is sucked and held by the three suckers 233, while as the pump unit 236 delivers air to the contrary, the suction and holding are canceled.

Meanwhile, a sucking base 242 is fixed to an end portion of the second hand 240, and a flared sucker 243 projecting downward is provided on its distal end side by using as a center a holding reference axis L2 for the X-Y direction which the second hand 240 has, as shown in FIG. 4. This sucker 243 is also provided with a suction hole, through which the sucker 243 is connected to a pump unit 246 via a tube 245 in the same way as the first hand 230, and the suction and holding of the lens LE' by the sucker 243 and its cancellation are effected.

It should be noted that the mechanism for holding the lenses LE and LE' may be arranged to nip the peripheral edges of the lenses.

<Eccentricity Measuring Apparatus>

Figure 5:
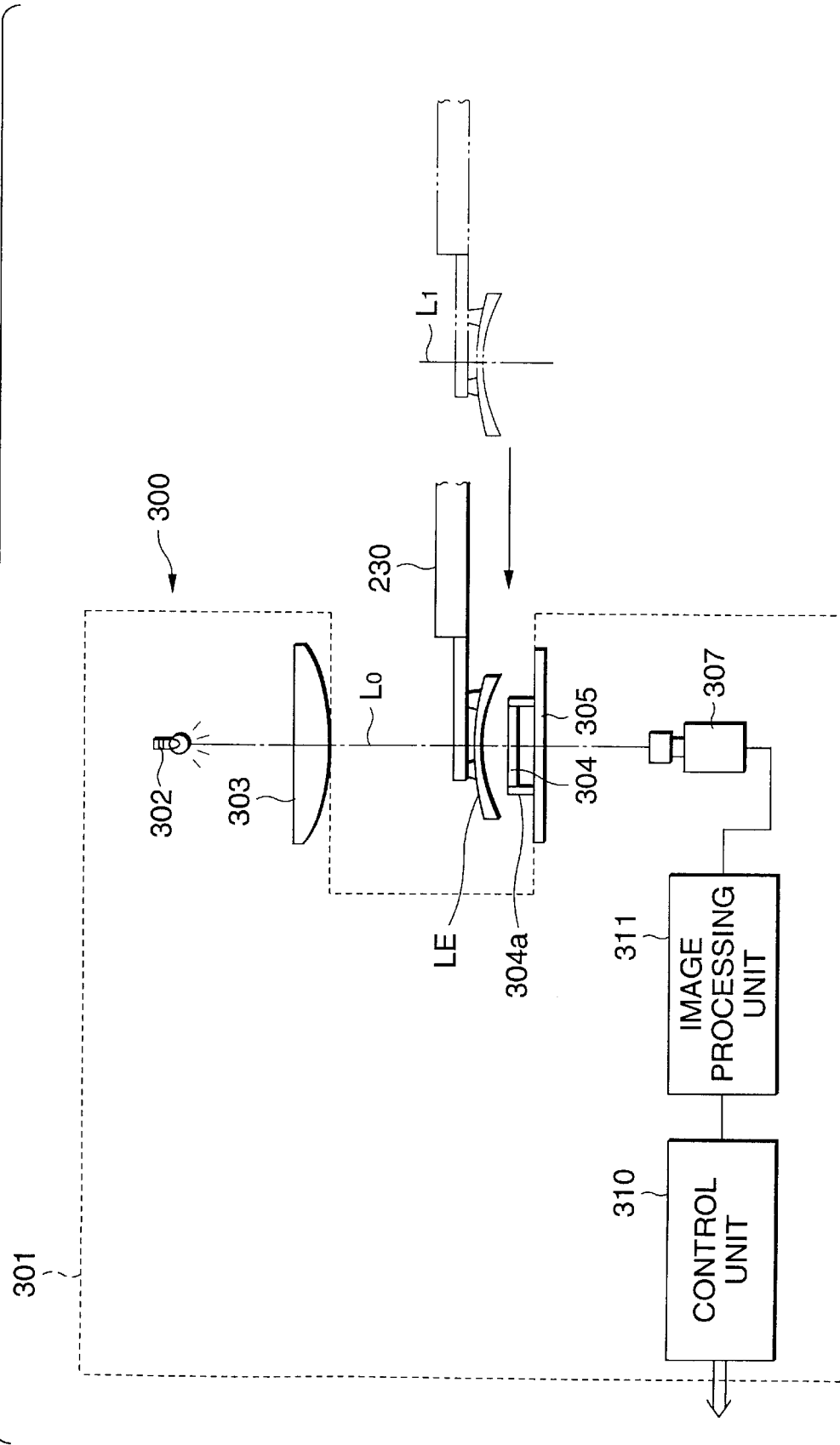
FIG. 5 is a diagram illustrating a measuring optical system and a control system of an eccentricity measuring apparatus.

A casing 301 of the measuring apparatus 300 has a substantially U-shaped side surface, and a measuring optical system and a control system shown in FIG. 5 are disposed in the casing 301. In FIG. 5, reference numeral 302 denotes an illuminating light source; 303, a collimator lens; and 305, a screen plate formed of a semitransparent material (e.g., ground glass). Numeral 304 denotes an index plate with a predetermined pattern formed thereon, and the index plate 304 is supported by a supporting member 304a embedded in the screen plate 305 so as to be located approximately 15 mm above the screen plate 305. The index plate 304 in this embodiment is arranged such that a grid index of black dots arranged at 0.5 mm-pitch intervals within the range of a 20-mm square by using as a center an optical axis L0 of measurement by the collimator lens 303 is formed on the transparent glass plate. It should be noted that this index plate 304 may be disposed on the light source 302 side with respect to the lens LE which is mounted as shown in FIG. 5 at the time of measurement. Numeral 307 denotes a CCD camera.

The lens LE is held by the first hand 230 which the aforementioned conveying apparatus 200 has, and the lens LE is disposed with its X-Y direction positioned such that the reference axis L1 of the first hand 230 becomes aligned with the optical axis L0 of measurement. In addition, the heightwise direction (Z-direction) of the lens LE is set in such a manner as to assume a predetermined heightwise distance with respect to the index plate 304.

The illuminating light from the light source 302 is converted to a substantially parallel beam of light by the collimator lens 303, and is projected onto the lens LE. The light beam which passed through the lens LE further illuminates the index plate 304, an image of the grid index subjected to the prismatic action of the refractive power of the lens LE is projected onto the screen plate 305, and this image is picked up by the camera 307. An image signal from the camera 307 is inputted to an image processing unit 311, and the processing unit 311 processes the obtained image, detects the position of the index image, and inputs its detection signal to a control unit 310. On the basis of the inputted detection signal, the control unit 310 determines the position of the optical center and the direction of the cylinder axis of the lens LE.

A description will be given of a method of determining the position of the optical center and the direction of the cylinder axis of the lens LE on the basis of the image obtained from the camera 307.

Figure 6:
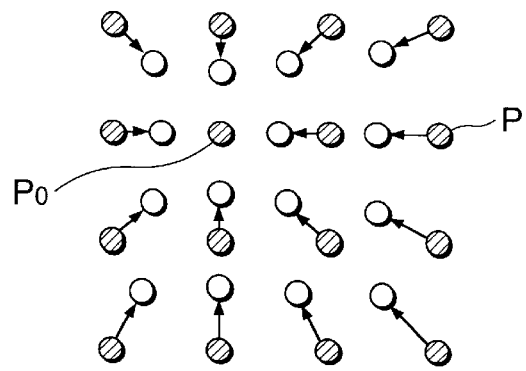
FIG. 6 is a diagram explaining a method of detecting the position of an optical center of a lens LE.

In the case where the lens LE is not mounted, since the grid index of the index plate 304 is illuminated by the parallel beam of light, the index image is projected as it is onto the screen plate 305. The control unit 310 stores in advance the coordinate positions of dot images at this time which are detected by the processing unit 311. If the lens LE is mounted, the dot image located immediately below the vicinity of the optical center of the lens remains at the same position irrespective of the presence or absence of the lens, but the coordinate positions of the dots images at portions which are not at the optical center move due to the prismatic action of the lens. Accordingly, to detect the optical center, a change in the coordinate position of each dot image with the lens LE mounted with respect to the coordinate position of each dot image with the lens LE removed is examined, and the position from or toward which the dot images diverge or converge as the center is determined. Namely, the center of this divergence or convergence can be detected as the optical center. In the example shown in FIG. 6, for instance, since the coordinate positions of dot images P with the lens LE removed converge at P0 as the center, the coordinate position of this P0 can be detected as the optical center. Even if the optical center is located between dots, it suffices if the center of movement is determined by interpolating the center of movement on the basis of the moving directions of the dot images and the amounts of their movement.

According to such a method, the position of the optical center can be detected accurately irrespective of the powers of the lenses, and the amount of eccentricity with respect to the optical axis L0 of measurement can be easily transformed into an absolute coordinate.

In a case where the lens LE has cylindrical power, the dot images move in a direction toward (or away from) a generating line of the lens. Hence, the direction of the cylinder axis can be similarly detected by examining in which direction the dot images are moving with respect to the coordinate positions of the dot images with the lens LE removed.

<Tray Conveying Apparatus>

In FIG. 1, the conveying apparatus 500 is constituted by a belt conveyor 501, and the trays 400 on the belt conveyor 501 are consecutively moved in the direction of arrow A. The conveyance of the trays 400 is stopped at a predetermined position Q1 where the acceptance and delivery of the lens LE (LE') are effected by the conveying apparatus 200. An ID tag 401 on which the work number of the pair of left and right lenses has been recorded is attached to each tray 400, and the work number of the ID tag of the tray 400 stopped t the position Q1 is read by an ID tag reader 502.

<Processing Apparatus>

Figure 7:
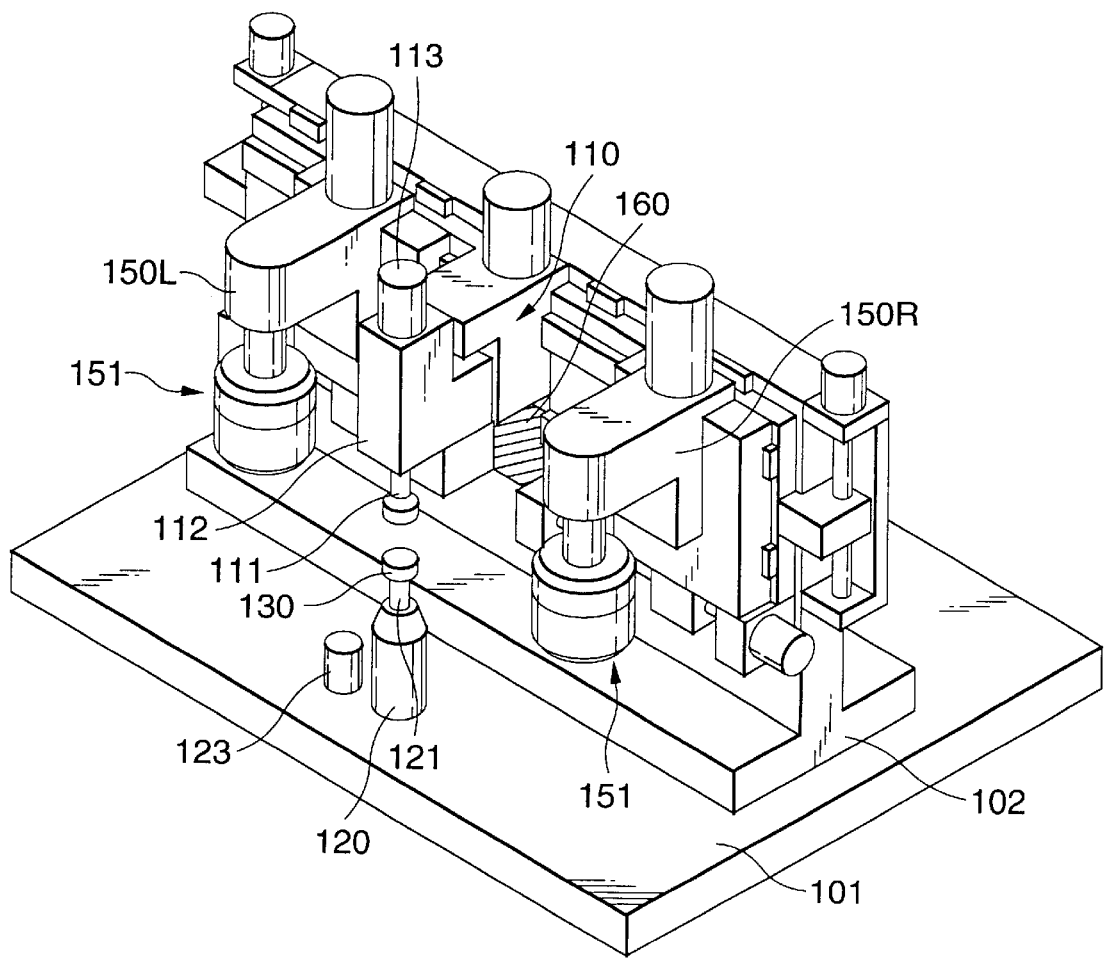
FIG. 7 is a diagram explaining the configuration of the processing apparatus.
Figure 8:
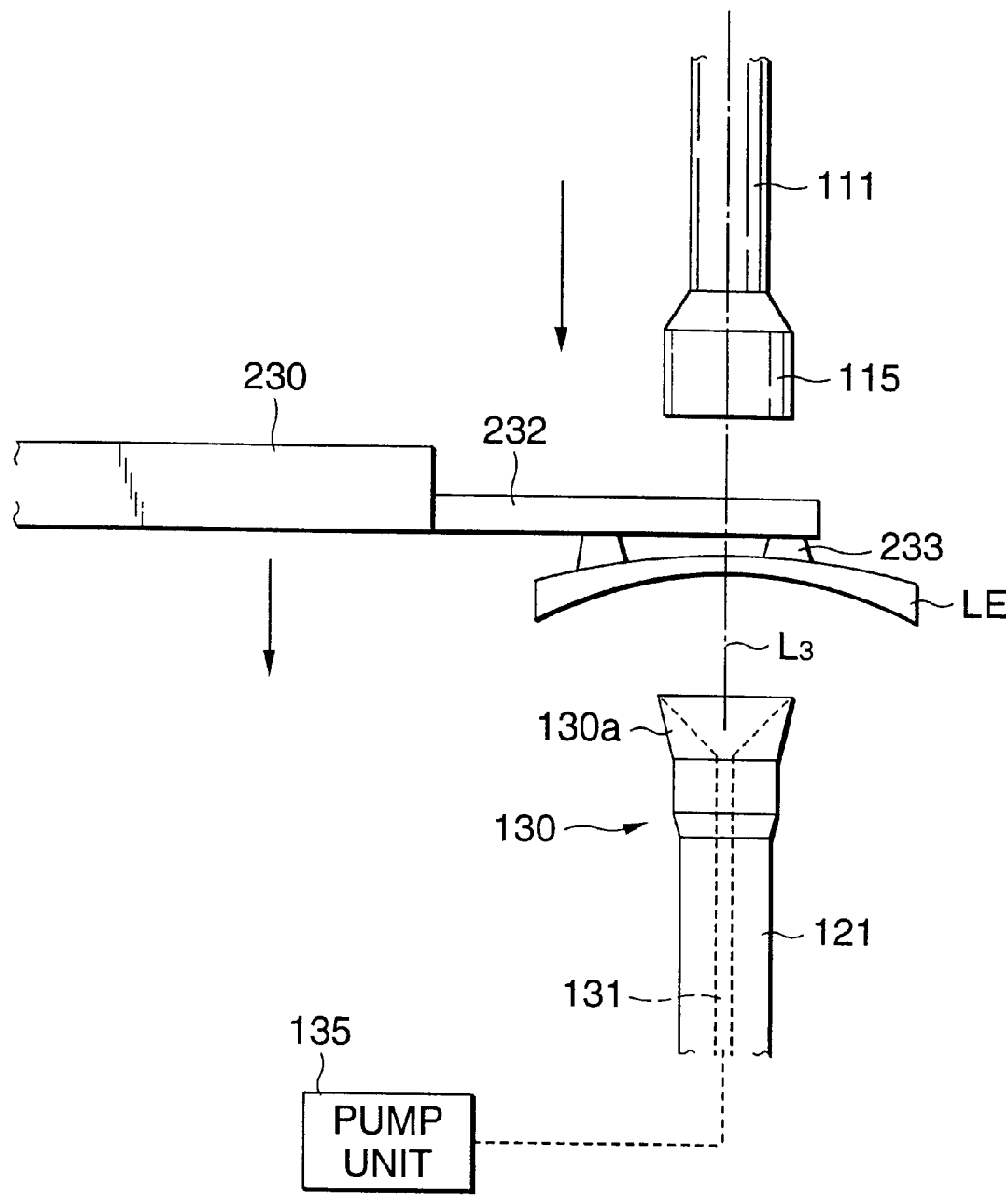
FIG. 8 is a diagram explaining the configuration of the distal end side of a chuck shaft of the processing apparatus.

Next, a description will be given of the configuration of the processing apparatus 100 with reference to FIGS. 7 and 8. The processing apparatus 100 nips and holds the lens LE by means of an upper chuck shaft 111 and a lower chuck shaft 121 which extend vertically. The upper chuck shaft 111 is moved vertically by a chuck upper portion mechanism 110 provided in the center of a sub-base 102, and is rotated by a pulse motor 113 attached to a holder 112. A lens holder 115 is attached to a lower end of the upper chuck shaft 111 (see FIG. 8).

The lower chuck shaft 121 is rotatably held by a holder 120 fixed to a main base 101, and is rotated by a pulse motor 123 in synchronism with the upper chuck shaft 111. A sucking member 130 having a rubber-made sucking portion 130a is attached to an upper end of the lower chuck shaft 121 (see FIG. 8). The sucking portion 130a is formed in a flared shape whose central portion is concave, and a suction hole is provided in a central portion thereof, to which is connected a pump unit 135 for effecting the suction and delivery of air through an air passage 131 formed inside the lower chuck shaft 121. After the lens LE is set on the sucking member 130 by the conveying apparatus 200, the upper chuck shaft 111 is lowered, and the sucking operation of the pump unit 135 is started, thereby making it possible to hold the lens LE so that the lens LE does not move during processing. When the lens LE is removed, its suction and holding can be canceled by delivering air to the sucking member 130.

The lens LE held by the upper and lower chuck shafts is ground from two directions by left and right lens grinding portions 150R and 150L each having a group of grinding wheels 151 (a plastic rough grinding wheel, a finishing grinding wheel having a beveling groove, etc.) on its grinding-wheel rotating shaft. The grinding portions 150R and 150L are bilaterally symmetrical, and are respectively moved vertically and horizontally by moving mechanisms provided on the sub-base 102.

In addition, a lens measuring portion 160 is accommodated on a farther side in the center of the sub-base 102, and the measuring operation of this measuring portion 160, the movement of the grinding portions 150R and 150L, and the angles of rotation of the upper and lower chuck shafts are controlled on the basis of data inputted to the control unit 160 which will be described later. It should be noted that since the configuration excluding the lower chuck shaft portion is basically similar to the one disclosed in Japanese Patent Unexamined Publication No. 97445/1996 (U.S. Pat. No. 5,803,793) filed by the present applicant, reference is had to be made to this publication for details.

Figure 9:
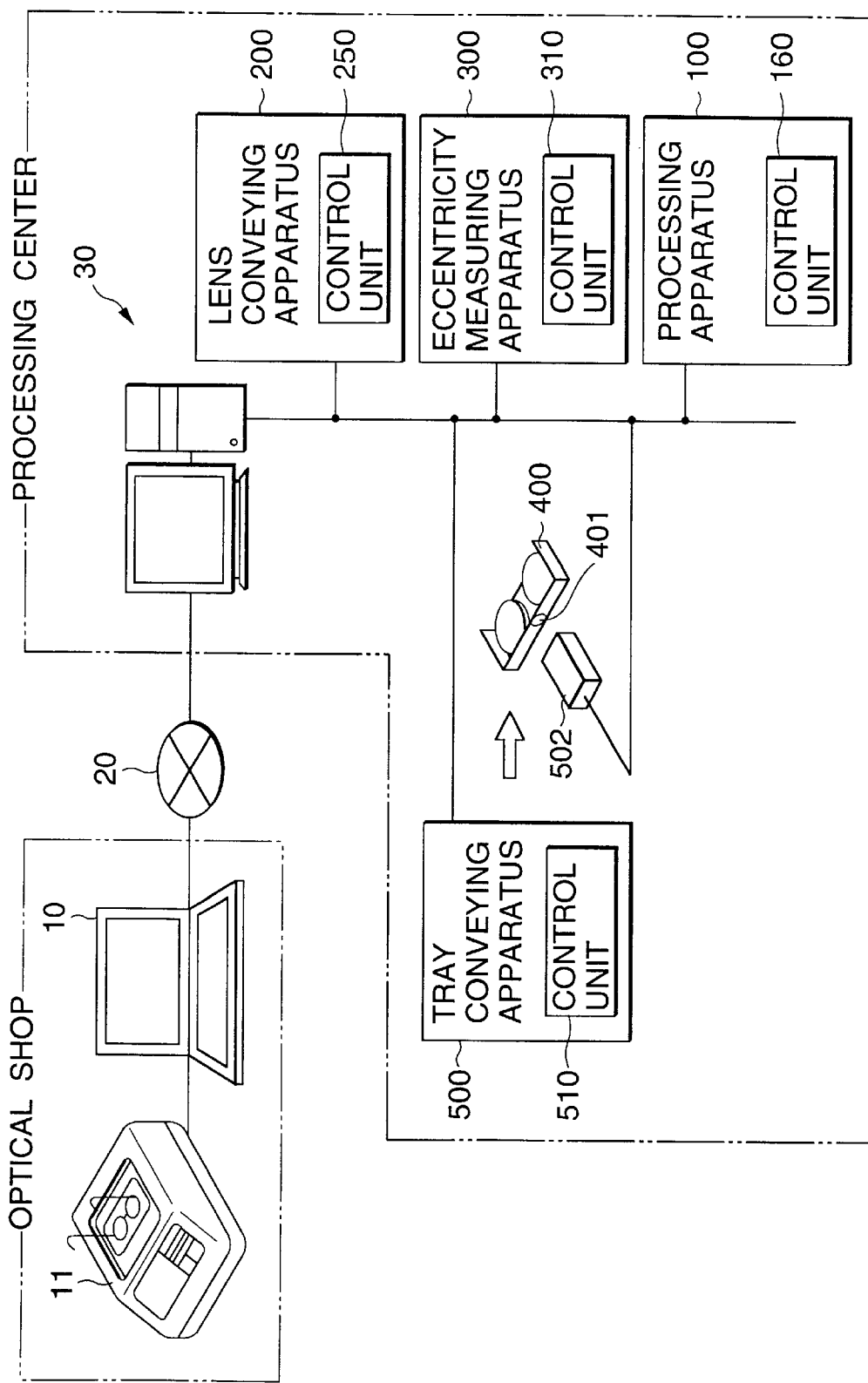
FIG. 9 is a diagram illustrating a system configuration concerning the order for lenses from an optical shop as well as the acceptance of orders and control processing in the grinding process at a processing center where the eyeglass lens automatic processing system in accordance with the present invention is installed.

Next, the operation of the eyeglass lens automatic processing system having the above-described configuration will be described with reference to a system configuration diagram shown in FIG. 9. FIG. 9 is a diagram illustrating the system configuration concerning the order for lenses from an optical shop as well as the acceptance of orders and control processing in the grinding process at the processing center where the processing system in accordance with the present invention is installed.

An ordering terminal 10 and an eyeglasses-frame measuring apparatus 11 are installed in the optical shop, and lens order data including the data on the eyeglasses frame shape measured by the apparatus 11, layout data of the lenses for the eyeglasses frame (the pupillary distance of a client, the distance between geometric centers of the eyeglasses frame, the height of the optical center from the geometric center, etc.), the lens type, lens prescription data (spherical power, cylindrical power, angle of the cylinder axis), and the like are inputted online from the ordering terminal 10 to a host computer (hereafter, a host PC) 30 at the processing center through a public communication line 20.

At the processing center, a work number is allotted to each of a multiplicity of pieces of order data inputted to the host PC 30, and the work number is registered for the ID tag 401 on each tray 400. A pair of left and right lenses LE of the specification read out from the host PC 30 is set on each tray 400 on the basis of the work number. At this time, each lens is set in such a manner that an approximate center of each lens is located at a predetermined point on the tray 400. Subsequently, the trays 400 with the lenses LE set thereon are consecutively placed on the belt conveyor 501 of the conveying apparatus 500 (these steps may be performed by the operator, but if an arrangement is adopted in which the steps are automatically performed by a robot, further automation can be realized).

When the setting of the trays 400 is completed, a control unit 510 of the conveying apparatus 500 effects conveyance by operating the belt conveyor 501, and when the tray 400 is brought to the predetermined position Q1 for delivering and receiving the lenses, its movement is stopped. At this time, the work number on the ID tag 401 attached to the tray 400 is read by the reader 502, and its signal is inputted to the host PC 30. The host PC 30 transmits data concerning lens processing corresponding to this work number to the processing apparatus 100.

Further, when the tray 400 is brought to the position Q1, the host PC 30 transmits an operation command signal to the conveying apparatus 200. A control unit 250 of the conveying apparatus 200 conveys the lens LE to a position of measurement by the measuring apparatus 300 in the following manner by controlling the driving of each motor. First, the base 210 and the base 220 are moved so that the holding reference axis L1 of the first hand 230 is brought to the predetermined point over the tray 400 where one lens LE is placed. Consequently, the optical center of the lens LE is located in the vicinity of the reference axis L1 within the substantially U-shaped configuration formed in the sucking base 232. Subsequently, the first hand 230 is lowered to the sucking position, and as the suction by the pump unit 236 is started, the lens LE (R) for the right eye is sucked and held by the three suckers 233.

After the lens LE is thus held, the first hand 230 is temporarily raised, and the first hand 230 together with the holder 222 is then rotated through 180 degrees to cause the first hand 230 to be oriented on the measuring apparatus 300 side. Subsequently, the base 210 and the base 220 are moved, the lens LE is conveyed to the position where the holding reference axis L1 of the first hand 230 is aligned with the measuring optical axis L0 of the measuring apparatus 300, and the lens LE is positioned at a predetermined height. This completes the disposition of the lens LE at the measuring position.

When the disposition of the lens LE is completed, a measurement starting signal is inputted from the host PC 30 to the measuring apparatus 300, and the control unit 310 of the measuring apparatus 300 determines the optical center of the lens LE by the above-described method from the image of the index image obtained from the camera 307, thereby obtaining eccentricity information with respect to the measuring optical axis L0 (namely, this serves as information on the eccentric position of the first hand 230 with respect to the holding reference axis L1). In addition, in a case where the lens LE has cylindrical power, the angle of the cylinder axis in the state in which the lens LE is held by the first hand 230 is obtained. The information on the eccentricity of the optical center (and the cylinder axial angle data) obtained by the control unit 310 is transmitted to the host PC 30.

When the measurement by the measuring apparatus 300 is completed, the conveying apparatus 200 conveys the lens LE held by the first hand 230 up to the processing apparatus 100. After the lens LE is placed such that a rotational axis L3 of the chuck shaft of the processing apparatus 100 and the reference axis L1 of the first hand 230 are aligned with each other, the lens LE is set on the sucking member 130 by the lowering operation of the first hand 230. Subsequently, the suction on the first hand 230 side is canceled, and the rear surface side of the lens LE is sucked onto the sucking member 130 by the sucking operation of the pump unit 135, thereby lowering the upper chuck shaft 111. As a result, the lens LE is chucked in the state in which its state at the time of eccentricity measurement is maintained. The first hand 230 which canceled the suction of the lens LE is moved away from the processing apparatus 100.

It should be noted that when the lens LE is set on the sucking member 130, if the optical center of the lens LE is offset substantially from the rotational axis L3 of the chuck shaft, there are cases where the accuracy of the processing shape is affected. As a countermeasure against this problem, it suffices if the host PC 30 determines whether the amount of eccentricity of the optical center obtained from the measuring apparatus 300 is within a predetermined range (e.g., 10 mm), and if the amount of eccentricity exceeds this range, the lens LE may be set by controlling the movement of the first hand 230 so as to correct that portion of eccentricity.

Figure 10:
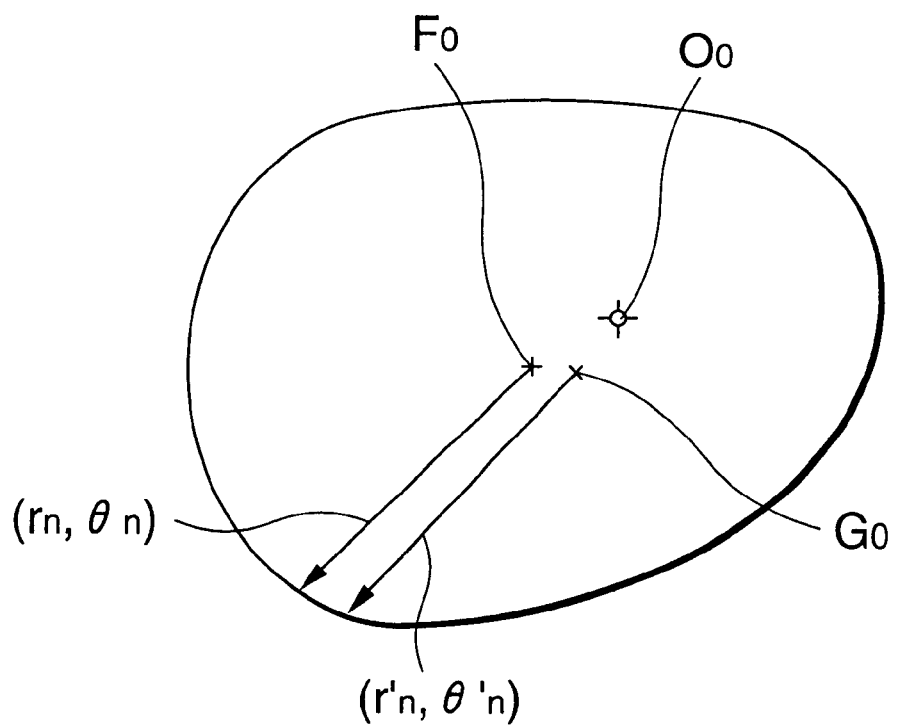
FIG. 10 is a diagram explaining a method of determining processing data for correcting a portion of eccentricity of the optical center with respect to a rotational axis L3.

When the chucking of the lens LE is completed, the host PC 30 inputs the eccentricity information obtained by the measuring apparatus 300 to the processing apparatus 100 to start processing. The control unit 160 of the processing apparatus 100 determines processing data (this processing data may be obtained on the host PC 30 side) in which the portion of eccentricity of the optical center with respect to the rotational axis L3 and a portion of offset in the angle of the cylinder axis are corrected, by incorporating the eccentricity information into the frame shape data, the layout data, the cylinder axial angle data of the lens prescription, and the like which have been inputted earlier. Namely, as shown in FIG. 10, the radial information (rn, θn) on the frame shape data using the geometric center $F_0$ of the frame shape as a reference is subjected to coordinate transformation using the rotational center $G_o$ of the lens as a reference on the basis of the coordinate position of the optical center $O_0$ determined from the layout data with respect to the geometric center $F_0$ as well as the coordinate position of the rotational center $G_0$ of the lens determined from the eccentricity information with respect to this optical center $O_0$, to thereby determine new radial information (r'n, θ'n). In addition, the angle of the cylinder axis is determined by being transformed into radial information in which the frame shape is rotated about the optical center $O_0$ so as to correct the offset portion of the detected axial angle with respect to the axial angle data in the prescription.

Subsequently, on the basis of the determined processing data, the control unit 160 effects processing while controlling the rotational angle of the lens LE and the movement (axis-to-axis distance between the chuck shaft and the grinding wheel shaft and the axial position of the rotating shaft of the grinding wheel with respect to the lens LE) of the grinding portions 150R and 150L with respect to the lens LE. As a result, the lens LE is accurately processed to an intended shape without using a conventional cup as a processing jig.

It should be noted that, at the time of setting the lens LE at the position of chucking by the chuck shafts 111 and 121, in addition to effect the setting as described above, the portion of eccentricity of the position of the optical center may be corrected by the control of X-Y movement of the first hand 230 (namely, such that the rotational center and the optical center of the lens are aligned with each other), or the frame center processing may also be effected such that the geometric center of the eyeglasses frame is aligned with the rotational center of the lens.

With respect to the rotational center of the lens, whether the reference axis L1 of the first hand 230 is to be aligned, whether the optical center of the lens LE is to be aligned, or whether the geometric center of the eyeglasses frame is to be aligned may be selected in advance by the host PC 30. Further, the host PC 30 may make the aforementioned determination and selection on the basis of the frame shape data and the layout data so that the processing shape will become stable.

In addition, in a case where a lens with an extremely eccentric layout or with a narrow vertical width is to be processed, if the lens is set as it is, there are cases where the chuck diameter of the processing apparatus 100 (the diameters of the sucking member 130 and the lens holder 115) projects outside the frame shape, causing interference in processing. In such a case as well, it suffices if the lens is set in such a manner as to avoid the interference in processing by offsetting the position of the lens chuck by controlling the X-Y movement of the first hand 230. For instance, a selection is made as to which of the aforementioned positions the lens is to be set.

In the case where the lens LE is thus set by controlling the X-Y movement of the first hand 230, the processing data is obtained on the host PC 30 side, and control of the movement is effected by the host PC 30.

Upon completion of processing of the lens LE, a processing completion signal is transmitted to the host PC 30. The host PC 30 causes the conveying apparatus 200 to operate again. The processed lens LE' is conveyed by the second hand 240. The second hand 240 is swiveled to the processing apparatus 100 side, and after the upper chuck shaft 111 on the processing apparatus 100 side has been raised, the second hand 240 moves to the position where the holding reference axis L2 of the second hand 240 is aligned with the rotational axis L3 of the chuck shaft. Subsequently, the suction on the lower chuck shaft 121 side is canceled, and the lens LE' is sucked and held by the sucker 243 of the second hand 240. After the lens LE' is held, the lens LE' is conveyed by the movement in the X-Y-Z direction and the swiveling motion of the second hand 240, and is returned to the tray 400.

When the processing of one lens is finished, the other lens is successively conveyed in a similar procedure, and processing is effected automatically. Thereafter, the conveyance and processing of the lens placed on each tray 400 is repeated automatically.

As described above, in accordance with the present invention, it is possible to effect processing accurately while managing the relationship between the rotational center and the optical center (and the angle of the cylinder axis) of the lens on the processing apparatus side without using the cup as a processing jig. As a result, the steps of the operation of inscribing a marked point on the lens by using the lens meter and the attachment and removal of the cup are made unnecessary, and automatic processing which saves the trouble of the operator can be effected very efficiently.

What is claimed is:

1. An eyeglass lens processing system comprising:
    a data input unit, which inputs frame shape data for processing a lens to be fitted to an eyeglass frame, and layout data for providing a layout of the lens with respect to a frame shape;
    a lens processing unit, having two shafts for clamping the lens, the processing unit rotates the shafts synchronously for grinding a periphery of the lens, at least one of the shafts has an end to which is provided a holding portion for holding the lens by directly contacting the lens surface without a cup as a processing jig;
    a first conveying unit, that conveys a tray on which the lens is placed and to which a management code is applied, the management code interrelating the lens placed on the tray to the data inputted by the data input unit;
    a lens measuring unit, which measures at least an optical center position of the lens by detecting and processing an image of a measurement index;
    a second conveying unit having a hand part for holding the lens by sucking or nipping and a moving unit for moving the hand part, wherein the second conveying unit picks and holds the lens from the tray using the hand part, disposes the lens at a predetermined position of the lens measuring unit, and mounts the lens to at least one of the shafts of the lens processing unit after measurement by the lens measuring unit; and
    an arithmetic unit, which obtains processing data based on (1) data read out based on the management code applied to the tray from the data inputted by the data input unit, and (2) measurement data obtained by the lens measuring unit, the arithmetic unit being connected to the lens processing unit.

2. The system of claim 1, further comprising:
    a control unit being connected to the data input unit and having a memory for storing the inputted data.

3. The system of claim 2, wherein the data input unit and the control unit are provided in respective different housings.

4. The system of claim 2, the control unit is further connected to the lens measuring unit and the arithmetic unit,
    the lens measuring unit sends the obtained measurement data to the control unit;
    the control unit reads out corresponding data from the data stored in the memory based on the management code applied to the tray, and sends the read data and the received measurement data to the arithmetic unit,
    the arithmetic unit obtains the processing data based on the data thus sent; and
    the lens processing unit processes the lens based on the obtained processing data.

5. The system of claim 2, wherein the control unit is further connected to the lens measuring unit and the second conveying unit, sends an operation instruction signal to the second conveying unit to convey the lens from the tray to the lens measuring unit when the tray is disposed at a predetermined position by the first conveying unit, and sends an operation instruction signal to the second conveying unit to convey the lens from the lens measuring unit to the lens processing unit when a measurement complete signal is inputted by the lens measuring unit.

6. The system of claim 5, wherein the control unit is further connected to the first conveying unit and sends an operation instruction signal to the second conveying unit to convey the lens from the tray to the lens measuring unit when a signal indicating that the tray is disposed at the predetermined position is inputted by the first conveying unit.

7. The system of claim 5, wherein the control unit is further connected to the lens processing unit, and sends an operation instruction signal to the second conveying unit to hold and pick the lens from at least one of the shafts and place the lens on the tray using the hand part when a processing complete signal is inputted by the lens processing unit.

8. The system of claim 1, wherein the arithmetic unit is further connected to the data input unit and the lens measuring unit and has a memory for storing the inputted data,
    the lens measuring unit sends the obtained measurement data to the arithmetic unit,
    the arithmetic unit reads out corresponding data from the data stored in the memory based on the management code applied to the tray, and obtains the processing data based on the read data and the received measurement data, and
    the lens processing unit processes the lens based on the obtained data.

9. The system of claim 1, further comprising:
    a reading unit which reads the management code applied to the tray.

10. The system of claim 1, wherein the data input unit includes a frame shape measuring unit which obtains the frame shape data.

11. The system of claim 10, wherein the frame shape measuring unit has an input part for inputting the layout data.

12. The system of claim 1, wherein the lens measuring unit obtains an angle of a cylinder axis of the lens by detecting and processing the image of the measurement index.

13. The system of claim 1, wherein the hand part of the second conveying unit holds the lens by vacuum suction.

14. The system of claim 1, wherein the holding portion has a suction hole formed therein that is connected to an air passage through which air is sucked and delivered, and wherein the holding portion holds the lens by vacuum suction.

15. An eyeglass lens processing system comprising:

a data input unit, which inputs frame shape data for processing a lens to be fitted to an eyeglass frame, and layout data for providing a layout of the lens with respect to a frame shape;

a lens processing unit, having two shafts for clamping the lens, the processing unit rotates the shafts synchronously for grinding a periphery of the lens, at least one of the shafts has an end to which is provided a holding portion for holding the lens by directly contacting the lens surface, without a cup as a processing jig;

a first conveying unit, that conveys a tray on which the lens is placed and to which a management code is applied, the management code interrelating the lens placed on the tray to the data inputted by the data input unit;

a lens measuring unit, which measures at least an optical center position of the lens by detecting and processing an image of a measurement index;

a second conveying unit having a hand part for holding the lens by sucking or nipping and a moving unit for moving the hand part; wherein the second conveying unit picks and holds the lens from the tray using the hand part, disposes the lens at a predetermined position of the lens measuring unit, and mounts the lens to at least one of the shafts of the lens processing unit based on measurement data after measurement by the lens measuring unit; and an arithmetic unit, which obtains processing data based on data read out based on the management code applied to the tray from the data inputted by the data input unit.

16. The system of claim 1, wherein the lens processing unit has a grinding wheel that relatively moves with respect to the clamped lens for grinding the periphery of the lens.

17. The system of claim 2, wherein the data input unit and the control unit are provided in the same housing.

18. The system of claim 15, wherein the hand part of the second conveying unit holds the lens by vacuum suction.

19. The system of claim 15, wherein the holding portion has a suction hole formed therein that is connected to an air passage through which air is sucked and delivered, and wherein the holding portion holds the lens by vacuum suction.

20. The system of claim 15, wherein the lens processing unit has a grinding wheel that relatively moves with respect to the clamped lens for grinding the periphery of the lens.

* * * * *